United States Patent
Maguire

(10) Patent No.: US 9,642,178 B2
(45) Date of Patent: May 2, 2017

(54) CONNECTION PROCEDURE FOR CELLULAR MOBILE NETWORKS

(75) Inventor: Patrick Maguire, Ballinamore (IE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 141 days.

(21) Appl. No.: 14/375,702

(22) PCT Filed: Feb. 3, 2012

(86) PCT No.: PCT/EP2012/051855
§ 371 (c)(1),
(2), (4) Date: Nov. 10, 2014

(87) PCT Pub. No.: WO2013/113397
PCT Pub. Date: Aug. 8, 2013

(65) Prior Publication Data
US 2015/0087322 A1    Mar. 26, 2015

(51) Int. Cl.
*H04W 76/02* (2009.01)
*H04W 76/04* (2009.01)
(Continued)

(52) U.S. Cl.
CPC ......... *H04W 76/028* (2013.01); *H04W 60/06* (2013.01); *H04W 60/02* (2013.01); *H04W 76/048* (2013.01)

(58) Field of Classification Search
None
See application file for complete search history.

(56) References Cited

U.S. PATENT DOCUMENTS

| | | | |
|---|---|---|---|
| 6,314,091 B1 | 11/2001 | Larowe et al. | |
| 2010/0223359 A1* | 9/2010 | Runstedler | H04W 4/08 709/219 |

(Continued)

FOREIGN PATENT DOCUMENTS

EP    2 385 734 A1    11/2011

OTHER PUBLICATIONS

"FCC to investigate cell phone logjam after earthquake" by McConnell et al., dated Aug. 25, 2011.*
"In emergencies, can cell phone network overload be prevented?" by Todd Weiss, dated Nov. 5, 2007.*
PCT International Search Report, mailed Jul. 5, 2012, in connection with International Application No. PCT/EP2012/051855, all pages.
3GPP TR 23.888 V1.6.0 "System Improvements for Machine-Type Communications (Release 11)" 3GPP, Sophia-Antipolis Cedex, France, Dec. 2, 2011, XP050575133, pp. 1-166.
Hitachi "Implicit Detach for Short Lived Sessions" 3GPP TD S2-110395 SA WG2, Meeting #83, Feb. 21-25, 2011, Salt Lake City, USA, XP05023558, pp. 1-2.

(Continued)

*Primary Examiner* — Daniel Lai
(74) *Attorney, Agent, or Firm* — Leffler Intellectual Property Law, PLLC

(57) ABSTRACT

A cellular mobile network allows a user equipment to connect to the network, the user equipment having a subscription for using the network to send data intermittently and to disconnect temporarily from the network automatically between its data transmissions. Parameters relating to the automated temporary disconnections are communicated, and data is sent from the user equipment while the user equipment is connected. The automated temporary disconnections and reconnections are detected by the network. By allowing user equipments which automatically disconnect temporarily between their data transmissions, the network need no longer provision for all such user equipments to be connected to the network simultaneously. Thus more such user equipments can be accepted as subscribers. By communicating with the user equipment about the temporary automated disconnections from the network, the network can have some control of, or at least be made aware of, the temporary automated disconnections.

17 Claims, 11 Drawing Sheets

(51) Int. Cl.
*H04W 60/06* (2009.01)
*H04W 60/02* (2009.01)

(56) References Cited

U.S. PATENT DOCUMENTS

| | | | | |
|---|---|---|---|---|
| 2012/0082079 | A1* | 4/2012 | Luo | H04L 1/1671 370/311 |
| 2012/0265818 | A1* | 10/2012 | Van Phan | H04W 8/005 709/204 |
| 2013/0003576 | A1* | 1/2013 | Segura | H04W 4/005 370/252 |
| 2013/0046821 | A1* | 2/2013 | Alanara | H04W 52/0216 709/204 |
| 2013/0215742 | A1* | 8/2013 | Sirotkin | H04W 28/0247 370/230 |
| 2013/0288732 | A1* | 10/2013 | Beale | H04L 47/12 455/509 |

OTHER PUBLICATIONS

Alcatel-Lucent "Time Control with Ability to Request Power Down" 3GPP TD S2-102519 SA WG2, Meeting #78, Feb. 22-26, 2010, San Francisco, USA, XP050434662, pp. 1-3.
3GPP TS 25.331, V11.0.0 Radio Resource Control (RRC); Protocol Specification (Release 11), Dec. 2011, all pages.
3GPP TS 21.111, V10.0.0 "USIM and IC Card Requirements" (Release 10), May 2011, pp. 1-18.
3GPP TS 24.008, V11.1.2 Mobile radio interface Layer 3 Specification; Core network protocols; Stage 3 (Release 11), Jan. 2012, pp. 1-653.

* cited by examiner

FIG 3

| USER EQUIPMENT | CELLULAR MOBILE NETWORK |
|---|---|
| SEND CONNECTION REQUEST  10 | ALLOW CONNECTION TO NETWORK  20 |
| COMMUNICATE PARAMETERS RELATING TO AUTO DISCONNECT INCLUDING STORING CONTROL PARAMETERS RECEIVED FROM NETWORK  35 | COMMUNICATE PARAMETERS RELATING TO AUTO DISCONNECT INCLUDING SENDING PARAMETERS FOR CONTROLLING THE AUTO DISCONNECTION  45 |
| SEND DATA INTERMITTENTLY  50 | RECEIVE AND PASS ON DATA  60 |
| AUTO DISCONNECT AND RECONNECT BETWEEN DATA TRANSMISSIONS ACCORDING TO RECEIVED CONTROL PARAMETERS  75 | DETECT DISCONNECTION AND UPDATE RECORDS  80 |

FIG 4

| USER EQUIPMEN | CELLULAR MOBILE NETWORK |
|---|---|

SEND CONNECTION REQUEST  10 → ALLOW CONNECTION TO NETWORK  20

COMMUNICATE PARAMETERS RELATING TO AUTO DISCONNECT INCLUDING SENDING CONTROL PARAMETERS TO NETWORK  36 ↔ COMMUNICATE PARAMETERS RELATING TO AUTO DISCONNECT INCLUDING RECEIVING PARAMETERS USED BY USER EQUIPMENT FOR CONTROLLING THE AUTO DISCONNECTION  46

SEND DATA INTERMITTENTLY  50 → RECEIVE AND PASS ON DATA  60

AUTO DISCONNECT AND RECONNECT BETWEEN DATA TRANSMISSIONS CONTROLLED BY USER EQUIPMENT  76 → DETECT DISCONNECTION AND UPDATE RECORDS  80

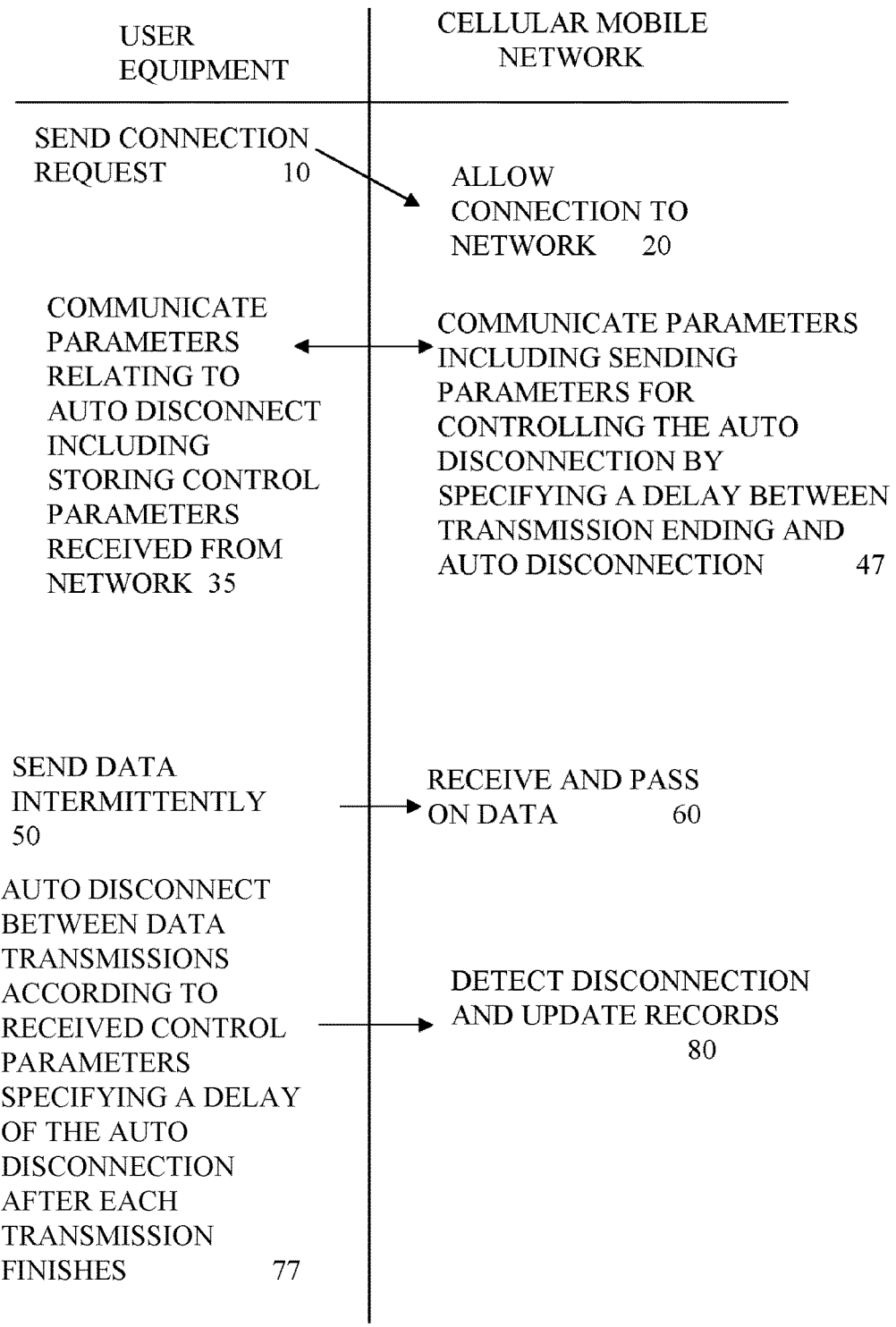

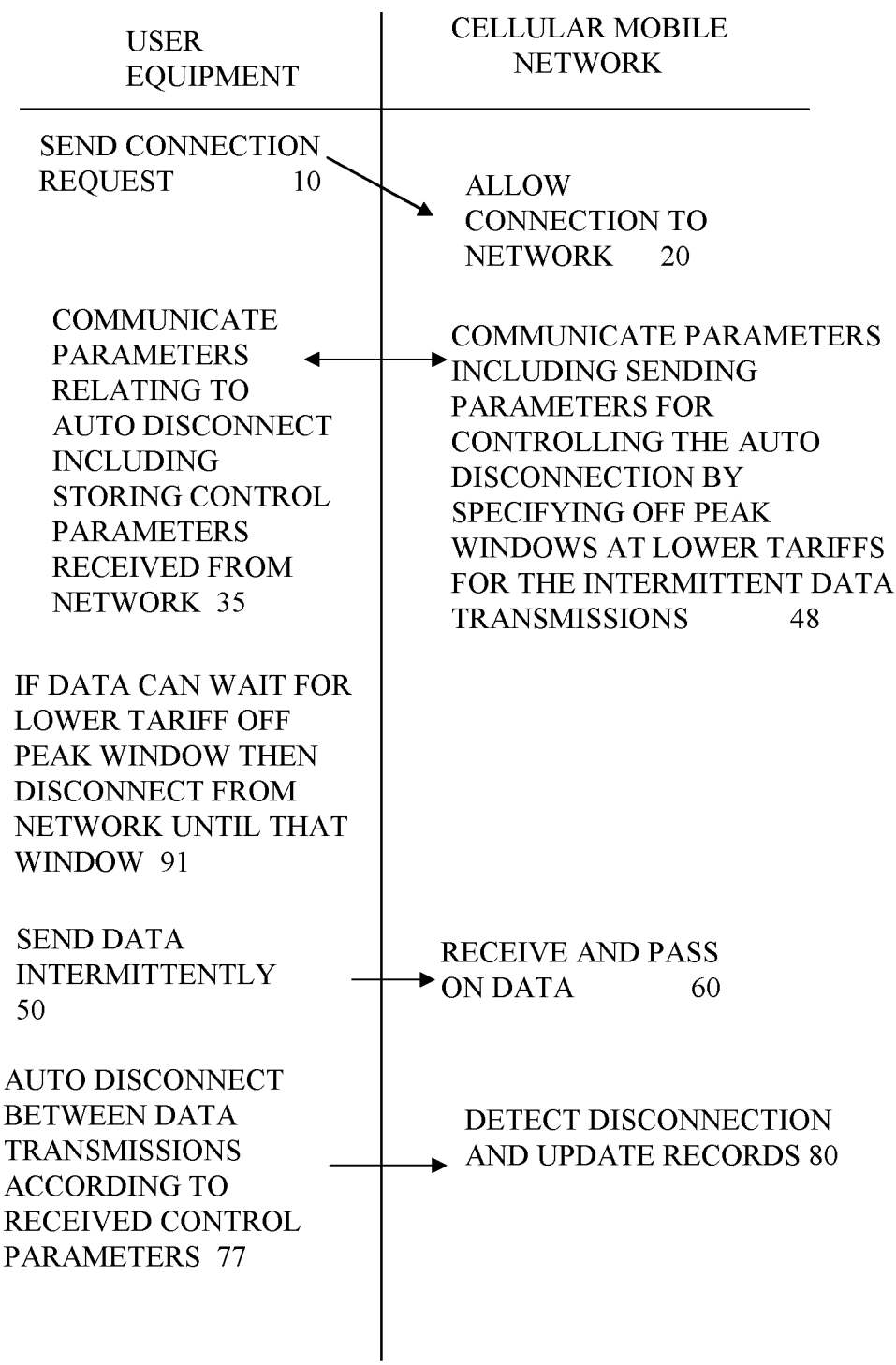

CONNECTION PROCEDURE FOR CELLULAR MOBILE NETWORKS

FIELD

The present invention relates to methods of operating a cellular mobile network, to methods of operating a user equipment to make a connection to such networks, to corresponding apparatus and to corresponding computer programs.

BACKGROUND

There are many examples of different types of cellular networks which provide for user equipment to connect to the network. In an UMTS cellular network, the User Equipment (UE), such as a cellular phone or wireless computing device (handheld or installed in static equipment), connects by carrying out an "attach" procedure with a base station of a cell, starting with repeated requests (preambles) on the Random Access Channel until the request is acknowledged. The successful conclusion of this sequence is known as "UE attach" or "MM attach".

Currently, all devices which connect to cellular wireless networks in order to transfer data are deemed to require bi-directional data transfer and mobility management. When a UE powers on, an ATTACH procedure is initiated towards the selected network so as to enable network and UE to execute its mobility management functionality and manage service requests for data transfer to and from the UE.

To support this procedure a signaling connection must first be established to configure the appropriate radio bearers to support the data transfer. This involves an RRC Connect Establishment Procedure which is executed between the UE and the UTRAN. In order to support the NAS signaling associated with an MM ATTACH procedure, an Initial Direct transfer Procedure is initiated between UE and UTRAN.

The MM Attach Procedure consists of an MM-ATTACH REQUEST message, which is embedded in the INITIAL DIRECT TRANSFER message between UE and UTRAN. When the UTRAN receives the INITIAL DIRECT TRANSFER message, it establishes a signaling connection with the CORE network in order to support transfer of the NAS signaling for the MM-ATTACH REQUEST message. Assuming the UE is authorized to attach to network, an MM-ATTACH ACCEPT message is sent from the CORE network to the UE via the UTRAN, embedded in a DOWNLINK DIRECT TRANSFER message.

As there are predictions of 50 billion connected devices by 2020, and predictions that M2M (machine to machine) enterprise will be a significant part of this, operator networks will require a significant increase in capacity to meet market demands. Spectrum availability is limited and so this may limit capacity of the networks. Required capacity from an operator's perspective is influenced by the volume of devices requiring connectivity. Today operators assume that all mobiles require an 'always on' connectivity model. In other words, if an operator has 5 million subscribers in his network, it must be dimensioned to support connectivity for all 5 million subscribers concurrently. Currently this assumption is also made for M2M connectivity. Having UEs connected to the network takes up resources such as processing and data storage resources for maintaining a record of the identities and locations of the connected UEs in the network, and takes up some bandwidth for periodic wireless communications with the UE to check it is still there and to check its signal strength for example.

SUMMARY

An object of the invention is to provide improved apparatus or methods. According to a first aspect there is provided a method of operating a cellular mobile network having the steps of allowing a user equipment to connect to the network, the user equipment having a subscription for using the network to send data intermittently and to disconnect temporarily from the network automatically between its data transmissions. One or more parameters relating to the automated temporary disconnections from the network between data transmissions, are communicated to or from the user equipment. The data sent from the user equipment while the user equipment is connected to the network is received, and the automated temporary disconnections of the user equipment from the network, and automated reconnections to the network are detected.

By allowing user equipments which automatically disconnect temporarily from the network between their data transmissions, the network need no longer provision for all such user equipments to be connected to the network simultaneously. Thus more such user equipments can be accepted as subscribers. By communicating with the user equipment about the temporary automated disconnections from the network, the network can have some control of, or at least be made aware of, the temporary automated disconnections from the network, such as for example when they can occur, or the proportion of time the user equipment will be connected to the network, or how long the user equipment will wait for more data to send, before initiating disconnection. Thus the network can plan for many such user equipments to be present, while not needing to provision for all to be connected simultaneously to the network. Maintaining many unused or little-used user equipments connected to the network simultaneously can involve costs such as spectrum occupation by connection management signals and thus increased interference with other channels, and processing resource for connection management such as periodically checking signal to noise ratio, and maintaining records of user equipments currently connected.

Thus, having knowledge of, or control of, the temporary automated disconnections, can enable better use of limited resources such as spectrum and processing resources, or better provisioning. Having reduced numbers or more predictable numbers of user equipments connected simultaneously also enables the network operator to plan for increased numbers of subscriptions for such user equipments for a given amount of provisioning. Having more subscriptions can enable networks to provide more cost effective tariffs for such user equipments, to suit applications which need only low frequency of intermittent data transmission and are not of high enough value to justify being connected all the time. See FIGS. 1 and 2 for example.

The automated disconnection can be controlled in various ways, to suit different applications. For example there can be a prearranged connected time to disconnected time ratio over any period, or disconnection after a given delay after the end of sending the data, or the disconnection be initiated by the network, or the given ratio or delay can be controlled by the network at busy times, for example. If the user equipment powers down its radio part during the temporary automated disconnections, there can be useful power savings to extend battery life for example. In some cases where the user equipment is a commercial installation rather than a hand-held personal device, there can be a reduction in OPEX for enterprises as frequency of battery replacement is reduced. Such reduced OPEX can be enough to make some lower value installations financially viable.

Any additional features can be added to these aspects, or disclaimed from them, and some are described in more detail below. One such additional feature is the communicating step having the step of sending one or more parameters to the user equipment over the connection to control the automated disconnection. This enables the network to control the automated disconnection, to help enforce the subscription or to avoid congestion at busy times for example. An alternative of relying on default parameters previously loaded into the user equipment is also possible but leaves the network needing to trust the user equipment or unable to adapt to different conditions. See FIG. 3 for example.

Another such feature us the communicating step having the step of receiving parameters from the user equipment relating to how the user equipment controls the disconnections. This enables the network to monitor the automated disconnections, to check they are within the subscription for example. This can be done with or instead of network control of the parameters. In the latter case this leaves the network needing to trust the user equipment, but may be simpler for the network which may be useful if there are many different types of user equipment, and can leave more flexibility for design of the user equipments. See FIG. 4 for example.

Another such feature is the one or more parameters comprising parameters relating to how long the user equipment waits for more data to send before carrying out the automated disconnection. Some delay can avoid unnecessary disconnections, but too much delay can waste network resources. This gives the network a degree of control to limit the amount of time connected without sending data. This can help limit the waste of resources implied. See FIG. 5 for example.

Another such additional feature is the one or more parameters comprising parameters relating to how long the user equipment remains temporarily disconnected from the network even if there is no data is to be sent, before temporarily reconnecting to the network. This enables the network to be made aware of the presence of user equipments which are within range but not sending data. See FIG. 6 for example.

Another such additional feature is the communicating step having the step of sending one or more parameters for disabling the temporary automated disconnection at the user equipment. This can give the network more control over the user equipment which might be useful for maintenance or adapting to unforeseen conditions without the cost of field visits to the user equipments. See FIG. 7 for example.

Another such additional feature is the communicating step comprising sending one or more of the parameters to the user equipment dependent on which cell of the network the user equipment is in. This enables the automated disconnection to be adapted to different conditions in each cell. This is particularly useful for urban and other densely populated cells, to enable parameters can be set to be more restrictive on connectivity in such cells. See FIG. 7 for example.

Another such additional feature is the communicating step having the steps of receiving from the user equipment, parameters relating to control by the user equipment of the temporary automated disconnections, and comparing these with a centralised record of the subscription for that user equipment. This can enable the network to enforce the subscription even where the user equipment has control of the automated disconnections. See FIG. 7 for example.

Another such additional feature is the communicating step having the step of sending one or more parameters to the user equipment relating to one or more time windows during which data can be transmitted at different tariffs. See FIG. 11 for example.

Another aspect of the invention provides a method of operating a user equipment having the steps of making a connection with a cellular mobile network for which the user equipment has a subscription for using the network to send data intermittently and to disconnect temporarily automatically from the network between data transmissions. One or more parameters relating to the automated temporary disconnections from the cellular mobile network, are communicated from the network, and the data is sent from the user equipment while the user equipment is connected to the network, and the automated temporary disconnections from the network is carried out in between the transmissions. A benefit to the user equipment is that power consumption can be reduced by such automated disconnections from the network, and more user equipments can share the same cell of the network.

Another such additional feature is the user equipment being arranged to control the automated disconnections according to the one or more parameters sent from the network.

Another such additional feature is the communicating step having the step of sending parameters from the user equipment relating to how the user equipment controls the disconnections.

Another such additional feature is the one or more parameters comprising parameters relating to how long the user equipment waits for more data to send before carrying out the automated disconnection.

Another such additional feature is the one or more parameters comprising parameters relating to how long the user equipment remains temporarily disconnected from the network even if there is no data is to be sent, before temporarily reconnecting to the network.

Another such additional feature is the step of receiving parameters relating to one or more time windows during which data can be transmitted at a different tariff, and the step of determining if data to be sent can wait for a lower tariff time window, and if so, disconnecting from the network until that time window. See FIG. 11 for example.

Another aspect of the invention provides a computer program having instructions on a computer readable medium which when executed by a computer of a cellular mobile network, cause the network to carry out any of the methods set out above.

Another aspect of the invention provides a computer program having instructions on a computer readable medium which when executed by a computer of a user equipment arranged to connect to a cellular mobile network, cause the user equipment to carry out any of the methods set out above.

Another aspect provides apparatus for a cellular mobile network having a connection management part arranged to allow a user equipment to connect to the network, the user equipment having a subscription for using the network to send data intermittently and to disconnect automatically between data transmissions. The connection management part is arranged to communicate to or from the user equipment one or more parameters relating to the automated temporary disconnections from the network between data transmissions, and a data handling part is provided, arranged to receive the data sent from the user equipment over the connection. The connection management part is also arranged to detect the automatic temporary disconnections of the user equipment from the network and automated reconnections to the network.

Another such additional feature of the apparatus is the one or more parameters comprising parameters relating to how long the user equipment waits for more data to send before carrying out the automated disconnection. See FIG. 4 for example.

Another such additional feature of the apparatus is the one or more parameters comprising parameters relating to how long the user equipment remains temporarily disconnected from the network even if there is no data is to be sent, before temporarily reconnecting to the network. See FIG. 5 for example Another aspect of the invention provides user equipment having a connection management part for making a connection with a cellular mobile network for which the user equipment has a subscription for using the network to send data intermittently and to disconnect temporarily automatically from the network between data transmissions. The connection management part is arranged to communicate to or from the network one or more parameters relating to the automated temporary disconnections from the cellular mobile network, and a data handling part is provided, arranged to send the data from the user equipment while the user equipment is connected to the network. The connection management part is arranged to carry out the automated temporary disconnections from the network and automated reconnections to the network in between the data transmissions.

Any of the additional features can be combined together and combined with any of the aspects. Other effects and consequences will be apparent to those skilled in the art, especially over compared to other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which:

FIGS. 3 to 8 show schematic views of steps in connecting and disconnecting a user equipment according to other embodiments, FIG. 11 shows steps in connecting and disconnecting a UE according to an embodiment in which the parameters include off peak windows with lower tariffs for connection and data transmission.

DETAILED DESCRIPTION

Figure 1:
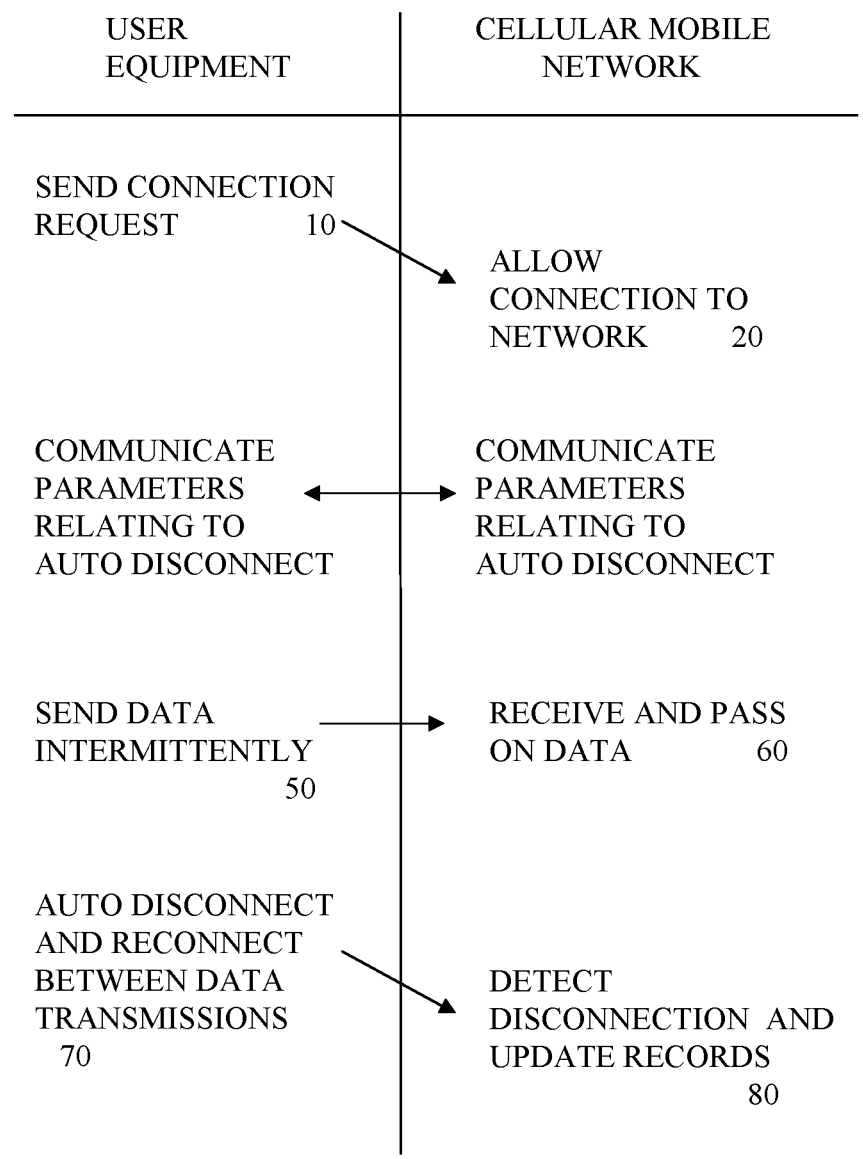
FIG. 1 shows a schematic view of steps in connecting and disconnecting a user equipment according to an embodiment.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Definitions:

Where the term "comprising" is used in the present description and claims, it does not exclude other elements or steps and should not be interpreted as being restricted to the means listed thereafter. Where an indefinite or definite article is used when referring to a singular noun e.g. "a" or "an", "the", this includes a plural of that noun unless something else is specifically stated.

Elements or parts of the described base stations, nodes or networks may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to base stations are intended to encompass any kind of base station, not limited to those of any particular wireless protocol or frequency, and not limited to being located at a single location and so can encompass distributed base stations having functions at different locations or shared functions in a computing cloud shared between multiple base stations.

References to software can encompass any type of programs in any language executable directly or indirectly on processing hardware.

References to processors, hardware, processing hardware or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example.

References to connections can encompass attaches or any message or protocol over any kind of channel to indicate a wireless user equipment wishes to communicate via the base station, and encompassing, but not limited to the examples of sending a preamble from user equipment using a shared random access channel, or any other type of channel without time allocation, or any other type of channel without priority allocation.

Abbreviations
GPRS General Packet Radio Service
GSM Global System for Mobile communications
HLR Home Location Register
IMSI International Mobile Subscriber Identity
LSA Localised Service Area
M2M Machine to machine communication
MM Mobility Management
NAS Non-Access Stratum
OPEX Operating Expenditure
PLMN Public Land Mobile Network
RRC Radio Resource Control
SGSN serving GPRS support node
TLV Type-length-value
UICC Universal Integrated Circuit Card
USIM Universal Subscriber Identity Module
UTRAN UMTS radio access network UMTS Universal Mobile Telecommunication System
LTE Long-Term Evolution
RACH Random Access Channel
UE User Equipment Introduction It has now been appreciated that the "always connected" assumption leads to inefficient use of resources, particularly for M2M connectivity. In the area of M2M enterprise, there will be cases where bi-directional data transfer is not required all the time. In some cases enterprise solutions may only require data transfer in one direction for 99.9% of their operational time (e.g. tracking devices or weather equipment). For such scenarios it will always be the UE which initiates the contact with the network in order to transfer data. For many enterprise solutions the frequency of data transfer will also be very low, so it is particularly inefficient for such UEs to remain connected to the network indefinitely. As well as being inefficient for the network, battery life of UE devices which are not connected to the power grid will be reduced. This can in some cases increase OPEX costs for enterprise solutions involving such UE devices and in some cases may make the enterprise idea not financially sustainable/viable.

Additionally it may become important that operators charging models are flexible enough to stimulate enterprise growth in this emerging market. Such flexibility in the mobility solution offered by mobile networks does not exist today. Embodiments of the invention as described can give improvements in connectivity management for user equipment such as M2M devices for use in M2M schemes, and can help optimize spectrum efficiency for operator. In some cases, this can enable additionally increased battery life for user equipment such as remote devices not connected to the power grid and thus stimulate M2M Enterprise growth through tailored charging models and reduced enterprise OPEX.

Particularly for M2M devices which support UL only data transfer, it can be useful to provide under subscription control for the network to initiate a Network Disconnect. Such devices can later reconnect for example by initiating an IMSI ATTACH by an event trigger in a device application requiring data transfer. This automated disconnect feature can be disabled or subject to conditions set by the network operator, for example via its associated subscription data in the HLR.

By way of introduction to the embodiments, conventional connection procedures for cellular networks will be explained, to facilitate understanding of new features of the embodiments.

Some power saving is achieved in conventional networks as follows. In Bluetooth networks sleep or park modes are known, but these are not disconnections from cellular networks. Sleep modes can provided in cellular networks but without disconnecting from the network, so that the network is still aware where to find the user equipment. There can be automated disconnection from a service for example when a smart phone goes to sleep following an idle period, but that always leaves the connection with the network untouched so that the network is still aware of the user equipment. The cellular network never initiates a disconnection of user equipment from the network. The cellular network can force the user equipment off a particular radio channel, but again this leaves the user equipment still connected to the network in the sense that the network has a record of the user equipment and where it is located so that the network can send data to it, and it is able to use another radio channel without needing to go through the connection procedure.

FIG. 1, Procedure According to an Embodiment,

FIG. 1 shows a time chart with a sequence of steps by the user equipment and the apparatus of the cellular mobile network according to an embodiment. Time flows down the chart. A left hand column shows the steps of the user equipment and a right hand column shows steps of the network. At step 10 the user equipment sends a connection request to the network, depending on the type of network. At step 20 the network allows the UE to be connected. Depending on the network this might include authorisation checks and other steps. At steps 30 and 40 the UE and the network communicate parameters relating to automatic disconnection. This can be in either direction or both directions as will be explained in further examples. At step 50 the user equipment sends data intermittently. The network receives the data at step 60 and may process it or pass it on. Some of this may occur before steps 30 and 40. In some cases the data transmission can be in the other direction or in both directions. At step 70, there is auto disconnection and automated reconnection between data transmissions. At step 80, the network detects the disconnection and updates its records of UEs which are connected. Many additional steps can be added to these steps shown, to suit different networks or different UEs. While disconnected there is no bandwidth taken up by checking the UE is still there and checking its signal strength. Also there can be capacity for many more subscribers if many are disconnected most of the time.

Figure 2:
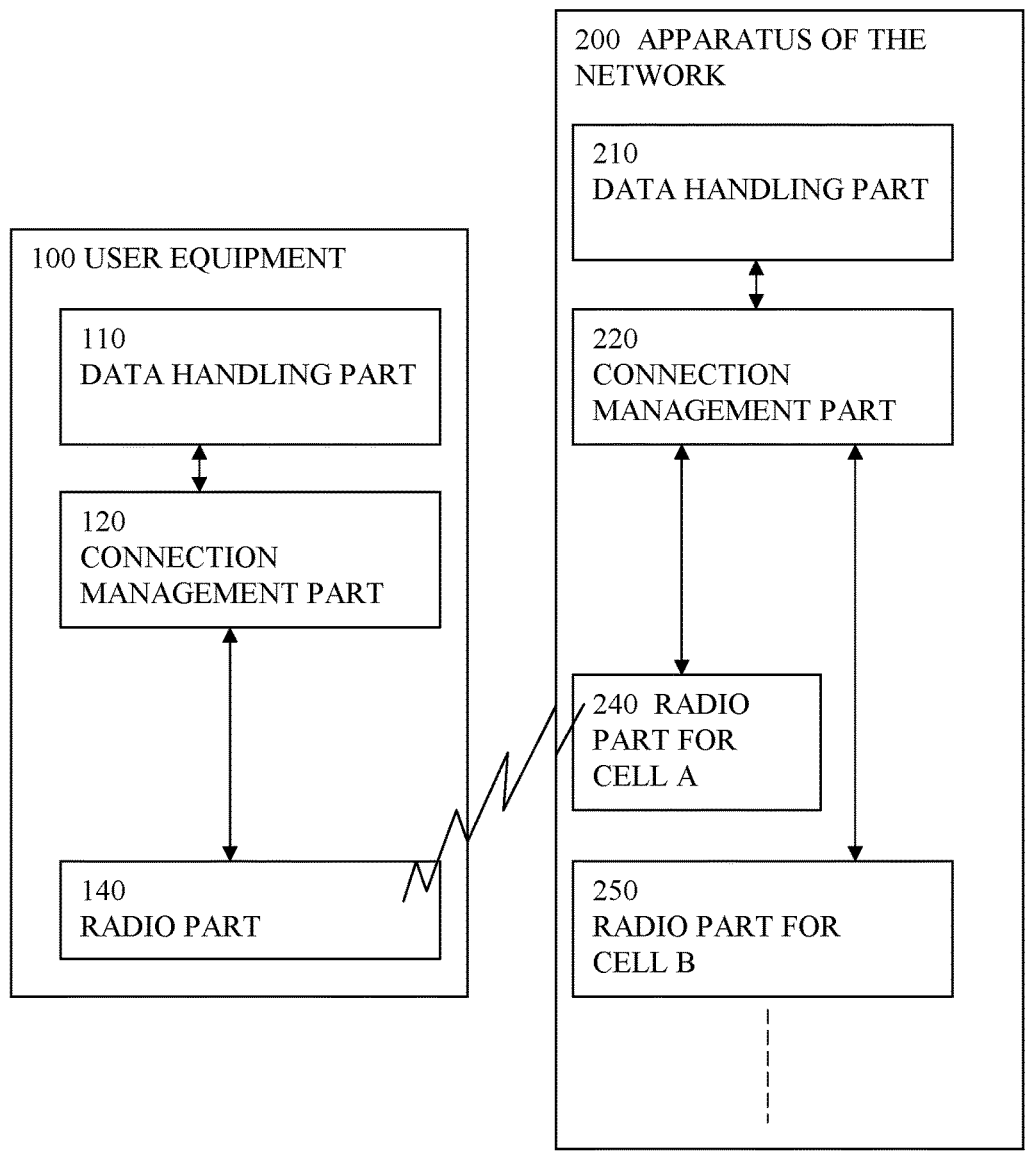
FIG. 2 shows a schematic view of user equipment and apparatus of the network according to an embodiment.

FIG. 2, User Equipment and Apparatus

FIG. 2 shows a schematic view of user equipment UE 100 and apparatus 200 of the network. The UE has a data handling part 110, a connection management part 120, and a radio part 140. Other parts can be added. The apparatus of the network includes a data handling part 210, a connection management part 220, and a radio part 240 for cell A, a radio part for cell B and so on for each of the cells of the network. Many other parts depending on the type of network may be present but are not shown.

FIGS. 3 to 8, Further Embodiments

FIG. 3 shows a time chart similar to that of FIG. 1, but steps 30 and 40 of FIG. 1 correspond to steps 35 and 45 in FIG. 3. At step 45, the network apparatus communicates parameters relating to auto disconnect including sending parameters for controlling the auto disconnection. At step 35 the communication of the parameters includes the UE storing control parameters received from the network. Step 70 of FIG. 1 has an equivalent step 75 in FIG. 3 which involves carrying out automated disconnect from, and reconnect to the network according to the received control parameters. This enables the network to have some control over the auto disconnection feature.

FIG. 4 shows a time chart similar to that of FIG. 1, but steps 30 and 40 of FIG. 1 correspond to steps 36 and 46 in FIG. 4. At step 36, the UE communicates parameters relating to auto disconnect including sending parameters used by the UE for controlling the auto disconnection. At step 46 the communication of the parameters includes the network receiving the control parameters sent from the UE. Step 70 of FIG. 1 has an equivalent step 76 in FIG. 4 which involves carrying out automated disconnect from, and reconnect to the network under the control of the UE according to the control parameters. Thus the network can be aware of the control parameters used, which may be useful to enable the network to check they are within the agreed subscription for example, or to enable the network to predict how much time the UE may be connected, to enable suitable provisioning.

FIG. 5 shows a time chart similar to that of FIG. 3, but step 45 of FIG. 3 corresponds to step 47 in FIG. 5. At step 47, the network apparatus communicates parameters relating to auto disconnect including sending parameters for controlling the auto disconnection by specifying a delay between a transmission ending and initiating an auto disconnection. At step 35 the communication of the parameters includes the UE storing control parameters received from the network. Step 75 of FIG. 3 has an equivalent step 77 in FIG. 5 which involves carrying out automated disconnect from, and reconnect to the network according to the received control parameters specifying a delay between a transmission ending and initiating an auto disconnection.

Figure 6:
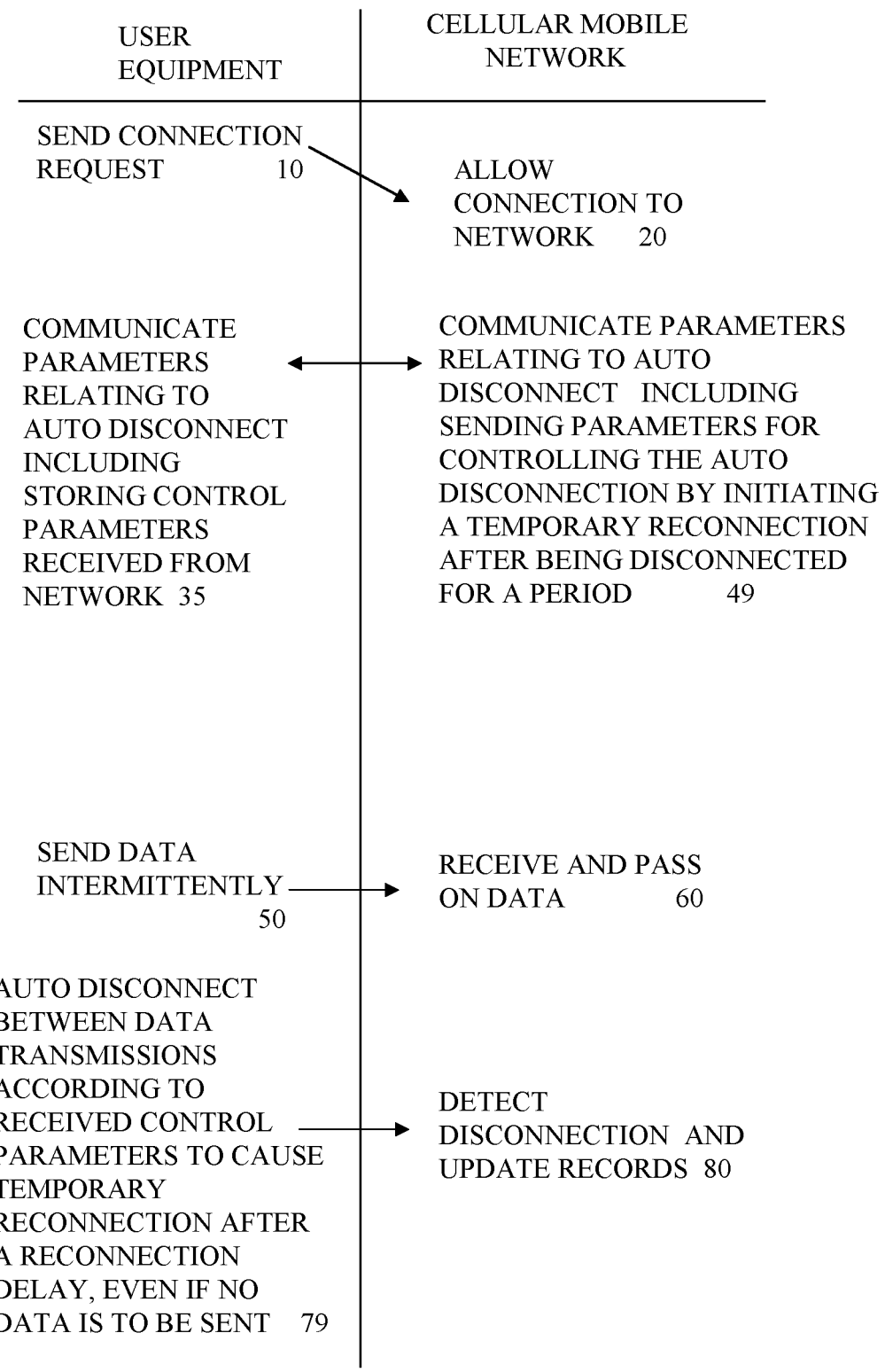

FIG. 6 shows a time chart similar to that of FIG. 3, but step 45 of FIG. 3 corresponds to step 49 in FIG. 5. At step 49, the network apparatus communicates parameters relating to auto disconnect including sending parameters for controlling the auto disconnection by initiating a temporary reconnection after being disconnected for a period. At step 35 the communication of the parameters includes the UE storing control parameters received from the network. Step 75 of FIG. 3 has an equivalent step 79 in FIG. 5 which involves carrying out automated disconnect from, and reconnect to the network according to the received control parameters to cause a temporary reconnection after a reconnection delay even if no data is to be sent.

Figure 7:
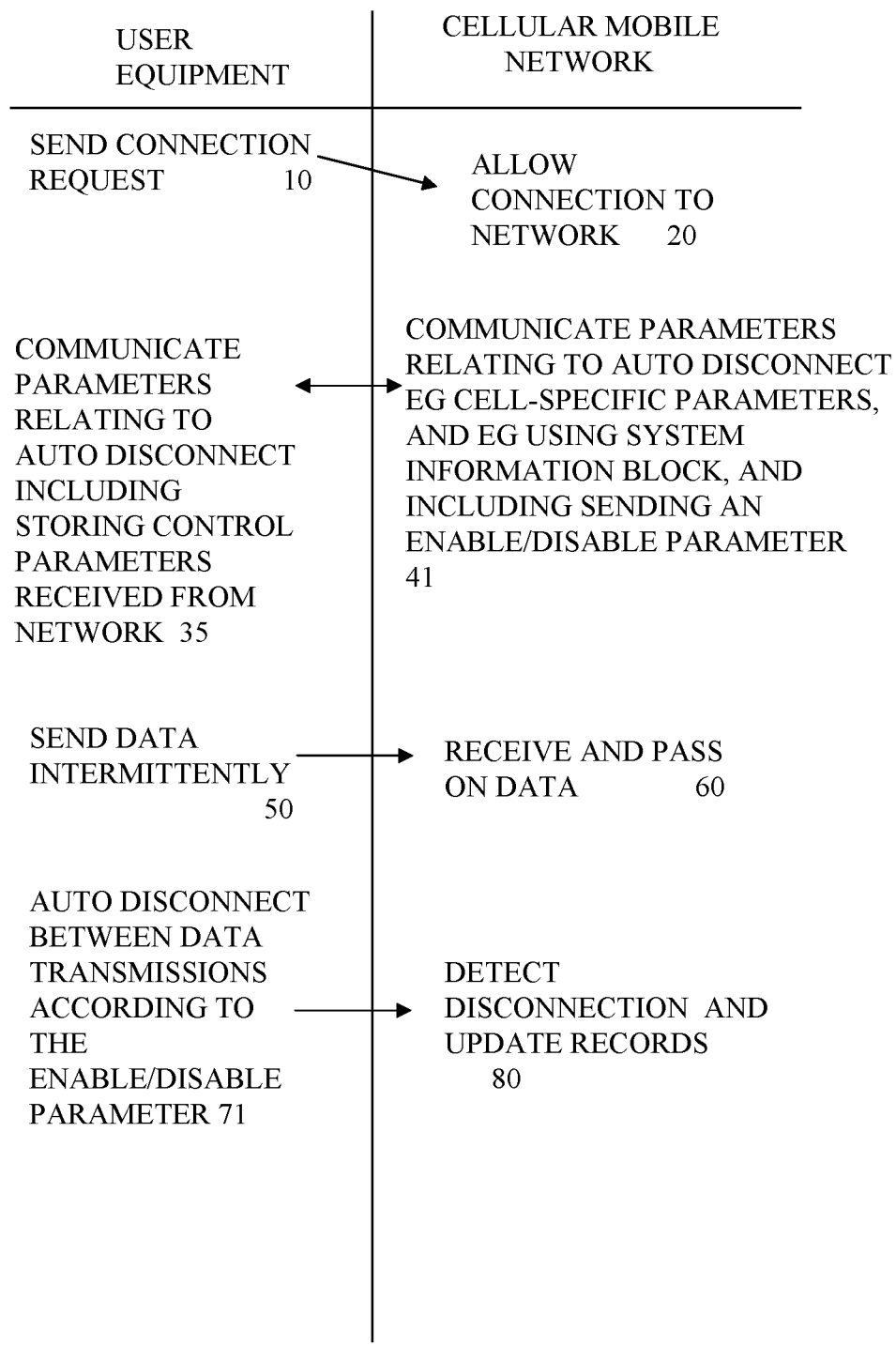

FIG. 7 shows a time chart similar to that of FIG. 3, but step 45 of FIG. 3 corresponds to step 41 in FIG. 7. At step 41, the network apparatus communicates parameters relating to auto disconnect including sending cell-specific parameters, and using for example a system information block for sending the parameters, and including sending an enable/disable parameter. At step 35 the communication of the parameters includes the UE storing control parameters received from the network. Step 75 of FIG. 3 has an equivalent step 71 in FIG. 7 which involves carrying out automated disconnect from, and reconnect to the network according to the received enable/disable parameter.

Figure 8:
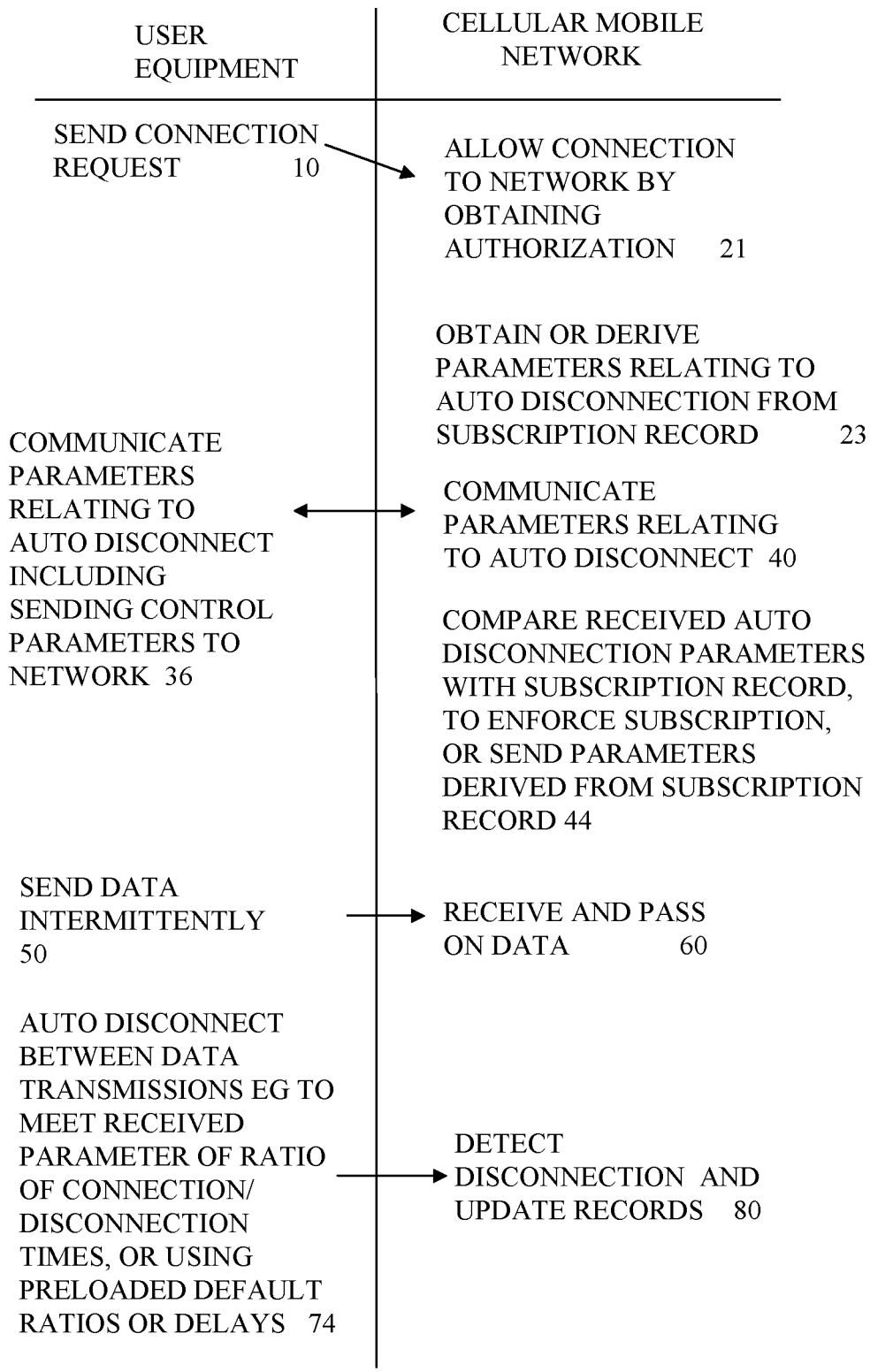

FIG. 8 shows a time chart similar to that of FIG. 4, but steps 21, 40 and 74 of FIG. 8 correspond to steps 20, 46 and 76 of FIG. 4 and additional steps 23 and 44 are shown. At step 21, connection is allowed to the network by obtaining authorization. At step 23 parameters relating to the auto disconnection are obtained from or derived from the subscription record held for that user. At step 36, the UE communicates parameters relating to auto disconnect including sending parameters used by the UE for controlling the auto disconnection. At step 44, following the network receiving the control parameters sent from the UE, there is a step of comparing the received auto disconnection parameters with the subscription record. This can be used to check for consistency and thus enforce the subscription, or can be a basis for sending adjusted parameters based on the subscription record and based on what has been received from the UE. Step 74 of FIG. 8 involves carrying out automated disconnect from, and reconnect to the network between data transmissions for example according to a received parameter indicating a ratio of connection and disconnection durations or other parameter. Pre-loaded default parameters can be used in some cases, if it is desired to simplify the procedure and reduce a need for the network to have compatibility with many different types of UE.

UMTS Network Embodiments.

A conventional connection procedure for an UMTS network can involve an RRC Connection Request to the network base station (e.g. UTRAN), to open a radio channel. In response, a corresponding RRC Connection set up message can be sent to the user equipment, and then an MM attach request signal can be sent over that radio channel to request the user equipment be connected to the network to enable data transmissions. This can be done using an initial direct transfer. The base station (UTRAN) can pass this on to core parts of the network for example for user authentication and authorization, typically using a subscriber record held in an HLR. The UTRAN can receive and send to the user equipment an MM attach accept message.

The structure of the conventional MM-ATTACH ACCEPT is as follows (from 3GPP TS 24.008);

Attach Accept

This message is sent by the network to the MS to indicate that the corresponding attach request has been accepted. See table 9.4.2/3GPP TS 24.008 set out below.

Message type: ATTACH ACCEPT
Significance: dual
Direction: network to MS

TABLE 9.4.2/3GPP TS 24.008

| | ATTACH ACCEPT message content | | | | |
|---|---|---|---|---|---|
| IEI | Information Element | Type/Reference | Presence | Format | Length |
| | Protocol discriminator | Protocol discriminator 10.2 | | | |
| | Skip indicator | Skip indicator 10.3.1 | | | |
| | Attach accept message identity | Message type 10.4 | | | |
| | Attach result | Attach result 10.5.5.1 | | | |
| | Force to standby | Force to standby 10.5.5.7 | | | |
| | Periodic RA update timer | GPRS Timer 10.5.7.3 | | | |
| | Radio priority for SMS | Radio priority 10.5.7.2 | | | |
| | Radio priority for TOM8 | Radio priority 2 10.5.7.5 | | | |
| | Routing area identification | Routing area identification 10.5.5.15 | | | |
| 19 | P-TMSI signature | P-TMSI signature 10.5.5.8 | | | |
| 17 | Negotiated READY timer value | GPRS Timer 10.5.7.3 | | | |

TABLE 9.4.2/3GPP TS 24.008-continued

ATTACH ACCEPT message content

| IEI | Information Element | Type/Reference | Presence | Format | Length |
|---|---|---|---|---|---|
| 18 | Allocated P-TMSI | Mobile identity 10.5.1.4 | | | |
| 23 | MS identity | Mobile identity 10.5.1.4 | | | |
| 25 | GMM cause | GMM cause 10.5.5.14 | | | |
| 2A | T3302 value | GPRS Timer 2 10.5.7.4 | | | |
| 8C | Cell Notification | Cell Notification 10.5.5.21 | | | |
| 4A | Equivalent PLMNs | PLMN List 10.5.1.13 | | | |
| B- | Network feature support | Network feature support 10.5.5.23 | | | |
| 34 | Emergency Number List | Emergency Number List 10.5.3.13 | | | |
| A- | Requested MS Information | Requested MS Information 10.5.5.25 | | | |
| 37 | T3319 value | GPRS Timer 2 10.5.7.4 | | | |
| 38 | T3323 value | GPRS Timer 2 10.5.7.4 | | | |
| | [2] T3312 extended value | GPRS Timer 3 [3] 10.5.7.4a | O | TLV | 3 |

Data relevant to the connection as provided by the network is stored in the UE. The UE can now support user data transfer in uplink and downlink direction. In relation to data storage on the device/UE, the USIM and the UICC located in the mobile device uniquely identified the subscriber/device user.

The UICC is the smart card used in mobile terminals in GSM and UMTS networks.

The UICC ensures the integrity and security of all kinds of personal data, and it typically holds a few hundred kilobytes.

The USIM is hosted on the UICC and provides storage for subscription and subscriber related information as shown in 3GPP TS 21.111. Both UICC and USIM information is configurable by the operator.

The UICC shall provide storage capability for the following:
UICC related information:
IC card identification: a number uniquely identifying the UICC and the card issuer;
Preferred language(s);
Directory of applications.
USIM related information:
Administrative information: indicates mode of operation of the USIM, e.g. normal, type approval;
USIM service table: indicates which optional services are provided by the USIM;
IMSI;
Language indication;
Location information;
Cipher key (Kc) and cipher key sequence number;
Access control class(es);
Forbidden PLMNs;
Ciphering Key for GPRS;
GPRS location information;
Cell Broadcast related information;
Emergency call codes;
Phone numbers (ADN, FDN, SDN);
Short messages and related parameters;
Capability and Configuration parameters;
Higher Priority PLMN search period;
list of carrier frequencies to be used for cell selection.
Information accessible to the USIM and other applications:
ADN.

MM Information Procedure

Another MM procedure of relevance to some embodiments is the MM Information procedure. The MM information procedure consists only of the MM INFORMATION message sent from the network to the mobile station. During an RR connection, the network can send none, one, or more MM INFORMATION messages to the mobile station. This message is sent by the network to the mobile station to provide the mobile station with subscriber specific information.

The structure of the MM INFORMATION message is as follows;

Message type: MM INFORMATION
Significance: dual
Direction: network to mobile station

TABLE 9.2.18/3GPP TS 24.008

| | | MM INFORMATION message content | | | |
|---|---|---|---|---|---|
| IEI | Information element | Type/Reference | Presence | Format | Length |
| | Mobility management protocol discriminator | Protocol discriminator 10.2 | M | V | ½ |
| | Skip Indicator | Skip Indicator 10.3.1 | M | V | ½ |
| | MM Information message type | Message type 10.4 | M | V | 1 |
| 43 | Full name for network | Network Name 10.5.3.5a | O | TLV | 3-? |
| 45 | Short name for network | Network Name 10.5.3.5a | O | TLV | 3-? |
| 46 | Local time zone | Time Zone 10.5.3.8 | O | TV | 2 |
| 47 | Universal time and local time zone | Time Zone and Time 10.5.3.9 | O | TV | 8 |
| 48 | LSA Identity | LSA Identifier 10.5.3.11 | O | TLV | 2-5 |
| 49 | Network Daylight Saving Time | Daylight Saving Time 10.5.3.12 | O | TLV | 3 |

UE States

The possible states for a conventional version of the MM sublayer of the UE of an UMTS network, supporting connection establishment and Initial Attach in the mobile station are as follows;

Null

The mobile station is inactive (e.g. power down). Important parameters are stored. Currently, only manual action by the user may transfer the MM sublayer to another state.

MM Idle

There is no MM procedure running and no RR connection exists except that a local MM context may exist when the RR sublayer is in Group Receive mode.

However MS is powered on and for devices not connected to an electrical grid, battery life is decreasing.

Location Updating Initiated

A location updating procedure has been started and the MM awaits a response from the network. The timer T3210 is running.

Wait for Outgoing Mm Connection

The MM connection establishment has been started, and the MM awaits a response from the network. The timer T3230 is running.

MM Connection Active

The MM sublayer has a RR connection to its peer entity on the network side. One or more MM connections are active.

IMSI Detach Initiated

The IMSI detach procedure has been started. The timer T3220 is running.

Process Cm Service Prompt

The MM sublayer has a RR connection to its peer entity on the network side. The Mobile Station has received a CM SERVICE PROMPT message but has not yet responded.

Wait for Network Command

The MM sublayer has a RR connection to its peer entity in the network, but no MM connection is established. The mobile station is passive, awaiting further commands from the network. The timer T3240 may be running.

Location Update Rejected

A location updating procedure has been rejected and RR connection release is awaited. The timer T3240 is running.

System Information Blocks

The network is continuously broadcasting System Information to all UE's in a cell (see 3GPP TS 25.331). The system information elements are broadcast in system information blocks. A system information block groups together system information elements of the same nature. Different system information blocks may have different characteristics, e.g. regarding their repetition rate and the requirements on UEs to re-read the system information blocks. Of particular use for embodiments involving sending parameters for controlling automated disconnection is System Information Block type 1.

The system information block type 1 contains NAS system information as well as UE timers and counters to be used in idle mode and in connected mode.

| Information Element/Group name | Need | Multi | Type and reference | Semantics description |
|---|---|---|---|---|
| CN information elements | | | | |
| SM-MAP NAS system | MP | | NAS system information (GSM-MAP) 10.3.1.9 | |
| CN domain system information list | MP | 1 to <maxCNdomains> | | Send CN information for each CN domain. |
| >CN domain system information | MP | | CN domain system | |

| Information Element/Group name | Need | Multi | Type and reference | Semantics description |
| --- | --- | --- | --- | --- |
| | | | information 10.3.1.2 | |
| UE information | | | | |
| UE Timers and constants in idle mode | MD | | UE Timers and constants in idle mode 10.3.3.44 | Default value means that for all timers and constants For parameters with need MD, the defaults specified in 10.3.3.44 apply and For parameters with need OP, the parameters are absent |
| UE Timers and constants in connected mode | MD | | UE Timers and constants in connected mode 10.3.3.43 | Default value means that for all timers and constants For parameters with need MD, the defaults specified in 10.3.3.43 apply and For parameters with need OP, the parameters are absent |

Features of UMTS Network Embodiment

Some embodiments of the invention for a UMTS network involve the following;

1. Subscriber/IMSI/Device data held in the HLR can now incorporate subscription, and Network Disconnect information. This data is configurable.
2. The US IM can also store Network Disconnect information as provided by the network.
3. The Network Disconnect functionality can be timer controlled and is activated in device on entering State MM IDLE.
4. The timer can be configurable at runtime via System Information.
5. The timer can be configurable on a per cell basis.
6. The Network Disconnect functionality may be made applicable to devices which are configured for UL Only data transfer. If the data transfer capability of the device changes at any time from UL Only, Network Disconnect functionality could then be disabled.

In some embodiments, Operator configurable subscription data per IMSI (Device/Service User) held in the HLR can be extended to include;

1. subscriptionID
2. networkDisconnectInformation, {Enable, Disable, Default=Disable}

As part of Attach procedure, the MM-ATTACH ACCEPT message can be extended to include;
   networkDisconnectInformation, {Enable, Disable, Default=Disable} as read from IMSI/subscription data in SGSN from HLR.

Subscription data per IMSI (Device/Service User) stored in the USIM, as provided by network can be extended to include;
   networkDisconnectInformation, {Enable, Disable, Default=Disable}

In System Information Block type 1, information element UE Timers and constants in idle mode can be extended to include new timer which will be used to determine when device will disconnect from network, if Network Disconnect functionality is enabled;
   networkDisconnectInformationTimer, {Value: t}

As part of Information procedure from network to UE, the MM-INFORMATION message can be extended to include;
   networkDisconnectInformation, {Enable, Disable, Default=Disable} as read from IMSI/subscription data in SGSN from the HLR.

Figure 9:
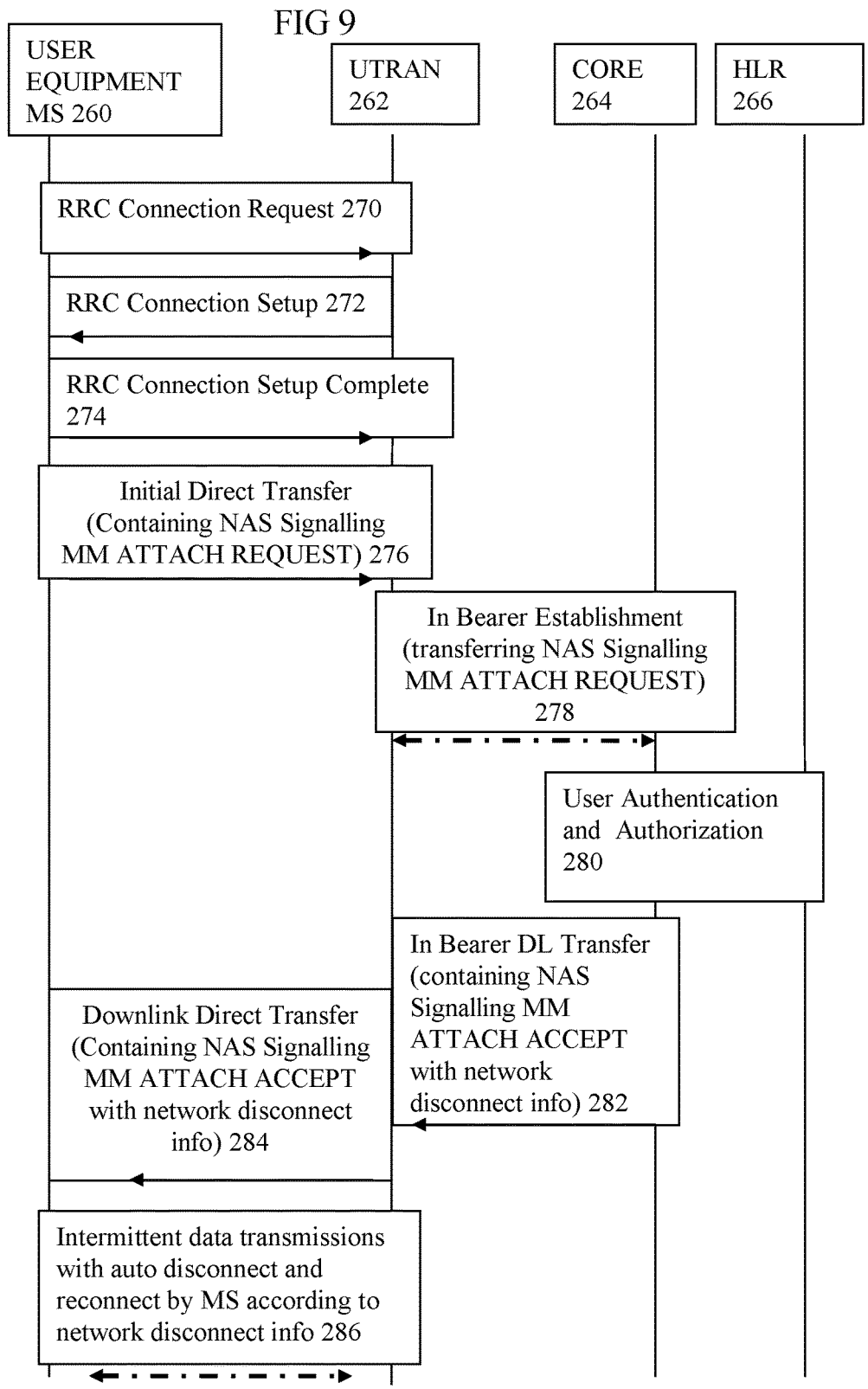
FIG. 9 shows a schematic view of UE states and actions in connecting and disconnecting according to an embodiment.

FIG. 9, Sequence Chart

One embodiment therefore presents the sequence shown in FIG. 9, assuming the user equipment has a configured data transfer capability of UL Only. This figure shows a time chart of the sequence with time flowing downwards, for actions of the UE MS 260, a UTRAN 262, a Core part 264, and an HLR part 266.

a) When a device is powered on, an Attach procedure will be initiated towards the network.
b) To support this procedure, a signaling connection must be established with the network. The RRC signalling connection establishment procedure is initiated. This involves sending from the UE an RRC connection request at step 270, the network responding with an RRC connection setup at step 272 and the UE sending an RRC Connection Setup complete indication at step 274.
c) Assuming the RRC connection establishment procedure is successful, the UE composes an RRC INITIAL DIRECT TRANSFER which contains the NAS signaling message MM-ATTACH REQUEST at step 276.
d) When the MM-ATTACH REQUEST is transferred by the UTRAN and received by the SGSN, user authentication and authorization follows at step 280. Part of this procedure is now extended to read the associated IMSI/Subscription data in SGSN as provided by HLR. This will include reading the new parameter networkDisconnectInformation.
e) Assuming authentication and authorization are successful, the SGSN will compose an MM-ATTACH ACCEPT message which will now include networkDisconnectInformation IE. This is transferred to the UTRAN at step 282 and reaches the UE at step 284.

f) Upon reception of MM-ATTACH ACCEPT message which will be embedded in an RRC DOWNLINK DIRECT TRANSFER, the UE can update parameter networkDisconnectInformation in the USIM as provided by the network.

g) On reception of MM-ATTACH ACCEPT, the UE is also enabled to receive System Information broadcasted by the network. The UE will read System Information block type 1 and store provided timers and constants, including new timer networkDisconnectInformationTimer.

h) When the UE enters a state MM IDLE, parameter networkDisconnectInformation is checked. If enabled, timer networkDisconnectInformationTimer is started. If the UE leaves state MM IDLE this timer is reset and stopped.

i) Upon expiration of timer networkDisconnectInformationTimer, the UE will disconnect from the network at step 286.

j) At some future time when UE requires to transfer data, the associated application in device via an event trigger will initiate an IMSI ATTACH.

k) The operator can at any time change the value of timer networkDisconnectInformationTimer via System information or may have different timer values per cell.

l) If operator decides to change this subscription level parameter, the MM Information procedure will be initiated towards all UEs associated with that subscription. The MM INFORMATION message will include the new parameter networkDisconnectInformation as provided by SGSN from HLR.

m) On reception of MM INFORMATION message in the UE/Device, parameter networkDisconnectInformation in the USIM will be updated.

Figure 10:
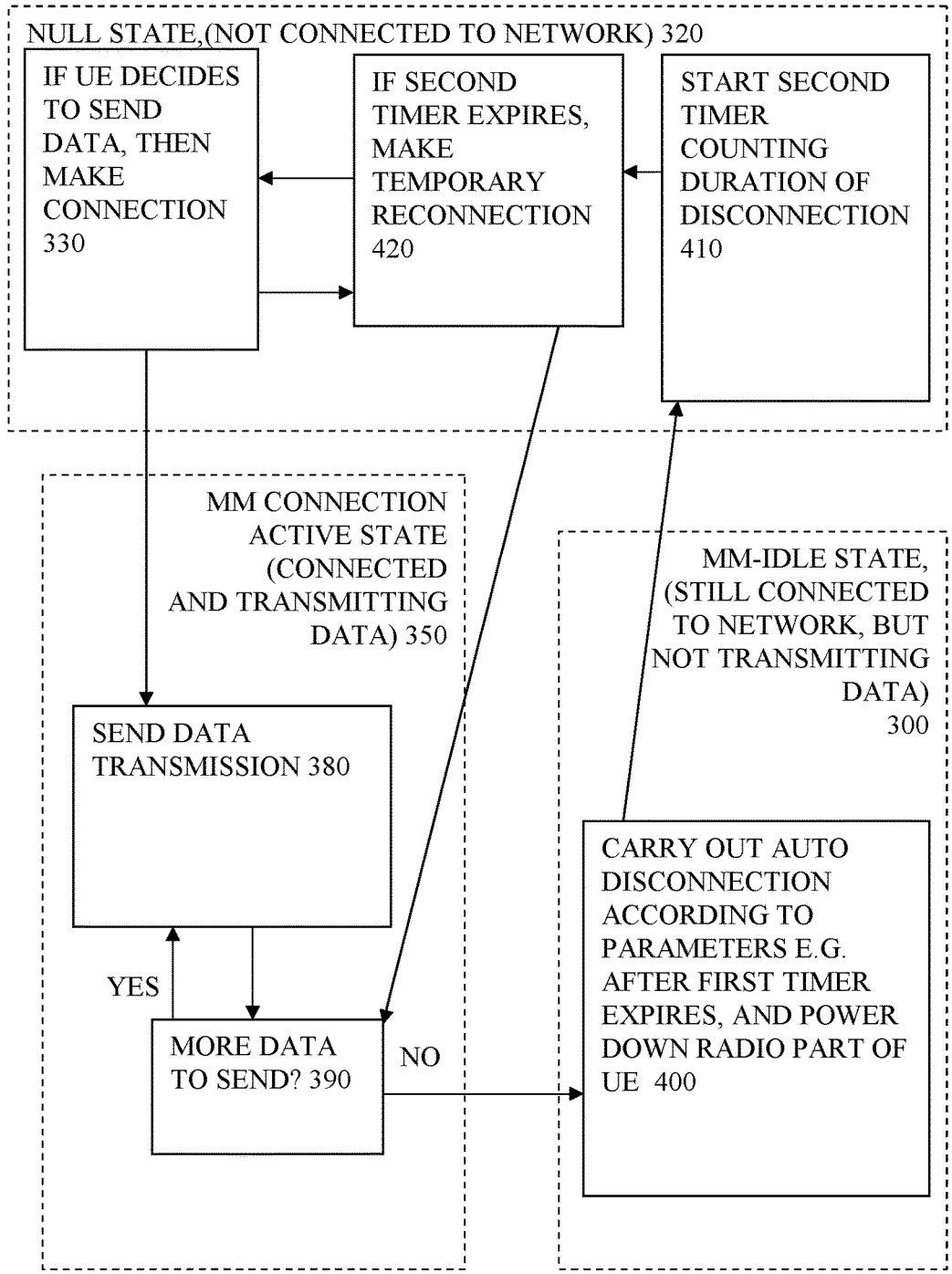
FIG. 10 shows a time chart of a sequence of steps by a user equipment and apparatus of the network according to an embodiment.

FIG. 10, UE States and Steps According to an Embodiment for an UMTS Network

FIG. 10 shows states and actions of a UE in an UMTS network according to an embodiment. There are three states shown (there can be many more not shown), MM-idle state 300 in which the UE is still connected to the network but not transmitting data, an MM connection active state 350 in which the UE is connected to the network and is transmitting the data, and a Null state 320 in which the UE is not connected to the network. During the Null state, the UE may decide to send data, in which case it then makes a connection 330 and in the MM connection active state there is the action of sending the data transmission 380. If there is no more data to send, at step 390 the MM idle state 300 is entered. Here at step 400, an auto disconnection from the network may take place according to parameters received from the network, for example indicating a duration of a first timer which once expired, triggers the auto disconnection. The radio part may be powered down here to save power.

The Null state is entered now and at step 410 a second timer is started, representing a duration of the disconnection. If this expires, at step 420, a temporary reconnection is made. This means the UE is in the MM connection active state and enables the network to check the UE is still there. If no data is to be sent, the UE returns to the MM idle state. When in the null state, while waiting for the expiry of the second timer, the UE may decide to send some data at step 330, as described above.

Other embodiments can be envisaged for other cellular network technologies such as LTE or others.

FIG. 11, Embodiment Having Time Windows for Different Tariffs

FIG. 11 shows a time chart similar to that of FIG. 5, but step 47 of FIG. 5 corresponds to step 48 in FIG. 5, and there is an additional step 91. At step 48, the network apparatus communicates parameters relating to auto disconnect including sending parameters for controlling the auto disconnection by specifying off peak time windows when data transmissions can be made, or made at one or more lower tariffs. At step 35 the communication of the parameters includes the UE storing control parameters received from the network. At new step 91, the UE determines if data to be transmitted to the network can wait for a lower tariff time window. If so then it waits, or disconnects from the network while waiting, as described above in other embodiments. Then once within the window, at some random time within the window, the data is sent at step 50 and received at step 60 at the network. Step 77 involves carrying out automated disconnect from, and reconnect to the network according to the received control parameters specifying a delay between a transmission ending and initiating an auto disconnection.

In some embodiments the following features can be used for the time window feature, though others can be envisaged:

a) Subscriber/IMSI/Device data held in the HLR can incorporate subscription, and Off-Peak Data Transfer Capability information. This data can be configurable and can be specified per service.

b) The USIM can also store Off-Peak Data Transfer Capability information as provided by the network.

c) Broadcasted System information can provide additional parameters used to determine the actual transmit window for each service supported by the UE.

d) The System Information can be configurable on a per cell basis.

e) The operator can configure the system information parameters supporting the Off-Peak Data Transfer Capability feature in run-time.

f) Attempts to transfer data outside the transmit window as agreed under subscription can be blocked in UL direction by the UE at initiation of RRC Connection Setup Procedure and in DL direction by network at initiation of Paging procedure.

For one embodiment, the Operator configurable subscription data per IMSI (Device/Service User) held in the HLR can be extended to include;

1. subscriptionID
2. offPeakDataTransferCapability, {Enable, Disable, Default=Disable}
3. offPeakDataTransferTarriffID, {Integer}

As a UE device may support more than one service, parameters 2 and 3 can be service specific.

As part of an Attach procedure, the MM-ATTACH ACCEPT message can be extended to include;
offPeakDataTransferCapability, {Enable, Disable, Default=Disable}
offPeakDataTransferTarriffID, {Integer}
as read from IMSI/subscription data in SGSN from HLR. As a UE device may support more than one service, these parameters can be service specific.

Subscription data per IMSI (Device/Service User) stored in the USIM, as provided by network can be extended to include;
offPeakDataTransferCapability, {Enable, Disable, Default=Disable}
offPeakDataTransferTarriffID, {Integer}

As a UE device may support more than one service, these parameters can be service specific.

In System Information Block type 1, information element CN common GSM-MAP NAS system information can be extended to include per supported Off-Peak tariff, Start time, Stop time and a transmit window size;

offPeakDataTransferTarriffID, {Integer}
      startTime, {24 hrs, in minutes}
      stopTime, {24 hrs, in minutes}
      transmitWindowSize, {minutes}

The transmitWindow for a particular device is determined as follows;

transmitWindowStartTime=startTime+(RANDΣ[(stopTime−startTime)/transmitWindowSize])*transmitWindowSize transmitWindowStopTime=transmitWindowStartTime+transmitWindowSize These equations can be implemented in the UE and SGSN.

As part of Information procedure from network to UE, the MM-INFORMATION message can be extended to include;

offPeakDataTransferCapability, {Enable, Disable, Default=Disable}
    offPeakDataTransferTarriffID, {Integer} as read from IMSI/subscription data in SGSN sent from HLR. As the UE device may support more than one service, these parameters can be service specific.

Thus there can be the following sequence;
a) When a device is powered on for the first time, an Attach procedure will be initiated towards network.
b) To support this procedure, a signaling connection must be established with the network. The RRC signalling connection establishment procedure is initiated.
c) Assuming the RRC connection establishment procedure is successful, the UE composes an RRC INITIAL DIRECT TRANSFER which contains the NAS signaling message MM-ATTACH REQUEST.
d) When the MM-ATTACH REQUEST is received by the SGSN, user authentication and authorization follows. Part of this procedure is now extended to read the associated IMSI/Subscription data in SGSN as provided by HLR. This will include reading the new parameters offPeakDataTransferCapability and offPeakDataTransferTarriffID for services associated with device subscription(s).
e) Assuming authentication and authorization are successful, the SGSN will compose an MM-ATTACH ACCEPT message which will now include offPeakDataTransferCapability and offPeakDataTransferTarriffID IE.
f) SGSN calculates transmitWindowStartTime and transmitWindowStartTime for each enabled service and stores results in MM context for its lifetime.
g) Upon reception of MM-ATTACH ACCEPT message which will be embedded in an RRC DOWNLINK DIRECT TRANSFER, the UE can update parameters offPeakDataTransferCapability and offPeakDataTransferTarriffID in the USIM as provided by network.
h) On reception of MM-ATTACH ACCEPT, the UE is also enabled to receive System Information broadcasted by the network. The UE will read System Information block type 1 and store provided timers and constants, including new parameters startTime, stopTime and transmitWindowSize per defined offPeakDataTransferTarriffID.
i) The UE calculates transmitWindowStartTime and transmitWindowStartTime for each enabled service.
j) Based on the real-time network load, the operator can at any time change the values of parameters startTime, stopTime and transmitWindowSize per defined offPeakDataTransferTarriffID via System information and may have different timer values per cell.
k) If operator decides to change these service level parameters, the MM Information procedure will be initiated towards all UEs associated with that subscription and service. The MM INFORMATION message will include the new parameter settings for offPeakDataTransferCapability and offPeakDataTransferTarriffID as provided by SGSN from HLR.
l) On reception of MM INFORMATION message in the UE/Device, parameters offPeakDataTransferCapability and offPeakDataTransferTarriffID in the USIM will be updated.
m) Authorization of MO data transfer in device and MT data transfer in SGSN must subsequently consider the parameter settings transmit WindowStartTime and transmit WindowStartTime as compared to the actual time.
    a. If actual time is within transmitWindow, data transfer may proceed and if disconnected then reconnection is made.
    b. If actual time is not within transmitWindow, data transfer will be blocked, and if connected, the auto disconnect may be carried out as described above.

As described above, this new UE auto disconnect connectivity feature supports the growing need for operators to maximize the network capacity thus supporting increased device volumes. Operators can support new businesses with reduced impact on their network resources. Battery life for remote device management not connected to power grid can be increased, thus reducing OPEX cost for associated enterprise. In some cases this will make new business ideas possible which otherwise would not be financially viable for enterprises. It can offer enterprises the opportunity to streamline the requirements on the services required from the operators network, which can be reflected in the associated subscriptions and charging model agreed. This could make new business ideas possible which otherwise would not be financially viable for both enterprises and operators.

It can also create new revenue streams for operators not only in terms of network traffic growth but also in area of enterprise management products and services.

Other variations and embodiments can be envisaged within the claims.

The invention claimed is:

1. A method of operating a cellular mobile network, the method comprising:
allowing a user equipment to connect to the network, the user equipment having a subscription for using the network to send data intermittently and to disconnect temporarily from the network automatically between its data transmissions;
communicating to or from the user equipment one or more parameters relating to the automated temporary disconnections from the network between data transmissions, wherein one or more of the parameters are cell-specific parameters, and wherein the communicating step comprises sending at least one of the one or more cell specific parameters to the user equipment dependent on which cell of the network the user equipment is in;
receiving the data sent from the user equipment while the user equipment is connected to the network;
detecting the automated temporary disconnections of the user equipment from the network, and automated reconnections to the network; and transmitting to the user equipment, parameters relating to one or more time windows during which data can be transmitted at a different tariff, wherein when the data to be sent from the user equipment can wait for a lower tariff time window, the user equipment is disconnected from the network until that time window.

2. The method of claim 1, the communicating step comprising sending one or more parameters to the user equipment to control the automated disconnection.

3. The method of claim 1, the communicating step comprising receiving parameters from the user equipment relating to how the user equipment controls the disconnections.

4. The method of claim 1, the one or more parameters comprising parameters relating to how long the user equipment waits for more data to send before carrying out the automated disconnection.

5. The method of claim 1, the one or more parameters comprising parameters relating to how long the user equipment remains temporarily disconnected from the network even if no data is to be sent, before temporarily reconnecting to the network.

6. The method of claim 1, the communicating step comprising sending one or more parameters for disabling the temporary automated disconnection at the user equipment.

7. The method of claim 1, the communicating step comprising receiving from the user equipment, parameters relating to control by the user equipment of the temporary automated disconnections, and comparing these with a centralised record of the subscription for that user equipment.

8. A method of operating a user equipment, the method comprising:
   making a connection with a cellular mobile network for which the user equipment has a subscription for using the network to send data intermittently and to disconnect temporarily automatically from the network between data transmissions;
   communicating to or from the network one or more parameters relating to the automated temporary disconnections from the cellular mobile network, wherein one or more of the parameters are cell-specific parameters, and wherein the communicating step comprises receiving at least one of the one or more cell specific parameters from the cellular mobile network dependent on which cell of the network the user equipment is in;
   sending the data from the user equipment while the user equipment is connected to the network;
   carrying out the automated temporary disconnections from the network in between the transmissions; and
   receiving parameters relating to one or more time windows during which data can be transmitted at a different tariff, and when the data to be sent can wait for a lower tariff time window, disconnecting from the network until that time window.

9. The method of claim 8, comprising the user equipment controlling the automated disconnections according to the one or more parameters sent from the network.

10. The method of claim 8, the communicating step comprising sending parameters from the user equipment relating to how the user equipment controls the disconnections.

11. The method of claim 8, the one or more parameters comprising parameters relating to how long the user equipment waits for more data to send before carrying out the automated disconnection.

12. The method of claim 8, the one or more parameters comprising parameters relating to how long the user equipment remains temporarily disconnected from the network even if no data is to be sent, before temporarily reconnecting to the network.

13. A non-transitory computer readable medium comprising instructions which, when executed by a computer of a cellular mobile network, cause the network to carry out a method of operating the cellular mobile network, the method comprising:
   allowing a user equipment to connect to the network, the user equipment having a subscription for using the network to send data intermittently and to disconnect temporarily from the network automatically between its data transmissions;
   communicating to or from the user equipment one or more parameters relating to the automated temporary disconnections from the network between data transmissions, wherein one or more of the parameters are cell-specific parameters, and wherein the communicating step comprises sending at least one of the one or more cell specific parameters to the user equipment dependent on which cell of the network the user equipment is in;
   receiving the data sent from the user equipment while the user equipment is connected to the network;
   detecting the automated temporary disconnections of the user equipment from the network, and automated reconnections to the network; and
   transmitting to the user equipment parameters relating to one or more time windows during which data can be transmitted at a different tariff, wherein when the data to be sent from the user equipment can wait for a lower tariff time window, the user equipment is disconnected from the network until that time window.

14. A non-transitory computer readable medium comprising instructions which, when executed by a computer of a user equipment arranged to connect to a cellular mobile network, cause the user equipment to carry out a method of operating the user equipment, the method comprising:
   making a connection with a cellular mobile network for which the user equipment has a subscription for using the network to send data intermittently and to disconnect temporarily automatically from the network between data transmissions;
   communicating to or from the network one or more parameters relating to the automated temporary disconnections from the cellular mobile network. wherein one or more of the parameters are cell-specific parameters, and wherein the communicating step comprises receiving at least one of the one or more cell specific parameters from the cellular mobile network dependent on which cell of the network the user equipment is in;
   sending the data from the user equipment while the user equipment is connected to the network;
   carrying out the automated temporary disconnections from the network in between the transmissions; and
   receiving parameters relating to one or more time windows during which data can be transmitted at a different tariff, and when the data to be sent can wait for a lower tariff time window, disconnecting from the network until that time window.

15. An apparatus for a cellular mobile network comprising:
   a connection management part arranged to allow a user equipment to connect to the network, the user equipment having a subscription for using the network to send data intermittently and to disconnect automatically between data transmissions, the connection management part being arranged to communicate to or from the user equipment one or more parameters relating to the automated temporary disconnections from the network between data transmissions, wherein one or more of the parameters are cell- specific parameters, and wherein the connection management part is arranged to send at least one of the one or more cell specific parameters to the user equipment dependent on which cell of the network the user equipment is in and to send to the user equipment parameters relating to one or more time windows during which data can be transmitted at a different tariff; and a data handling part arranged to receive the data sent from the user equipment over the connection the connection management part also being arranged to detect the automatic temporary disconnections of the user equipment from the network when the data to be sent from the user equipment can wait for a lower tariff time window and automated reconnections to the network.

16. The apparatus of claim 15, the one or more parameters comprising parameters relating to how long the user equipment waits for more data to send before carrying out the automated disconnection.

17. A user equipment comprising:

a connection management part for making a connection with a cellular mobile network for which the user equipment has a subscription for using the network to send data intermittently and to disconnect temporarily automatically from the network between data transmissions, the connection management part being arranged to communicate to or from the network one or more parameters relating to the automated temporary disconnections from the cellular mobile network. wherein one or more of the parameters are cell-specific parameters, and wherein the connection management part is arranged to receive at least one of the one or more cell specific parameters from the cellular mobile network dependent on which cell of the network the user equipment is in and receive parameters relating to one or more time windows during which data can be transmitted at a different tariff; and a data handling part arranged to send the data from the user equipment while the user equipment is connected to the network, and the connection management part being arranged to carry out the automated temporary disconnections from the network and automated reconnections to the network in between the data transmissions ,and when the data to be sent can wait for a lower tariff time window, disconnecting from the network until that time window.

* * * * *